(12) United States Patent
Olschewski et al.

(10) Patent No.: US 7,015,906 B2
(45) Date of Patent: Mar. 21, 2006

(54) METHOD AND ARRANGEMENT FOR IMAGING AND MEASURING MICROSCOPIC THREE-DIMENSIONAL STRUCTURES

(75) Inventors: Frank Olschewski, Heidelberg (DE); Jochen Nickel, Mannheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 122 days.

(21) Appl. No.: 09/683,795

(22) Filed: Feb. 15, 2002

(65) Prior Publication Data

US 2002/0158966 A1 Oct. 31, 2002

(30) Foreign Application Priority Data

Feb. 21, 2001 (DE) ................ 101 08 240

(51) Int. Cl.
*G06T 15/00* (2006.01)
(52) U.S. Cl. .............. 345/419; 348/12; 600/104
(58) Field of Classification Search ............. 345/419, 345/427, 782; 348/42, 121; 600/104, 439, 600/310, 478, 407; 359/368; 250/201.3; 604/22; 356/241.1; 352/243; 606/41; 128/898
See application file for complete search history.

(56) References Cited

U.S. PATENT DOCUMENTS 5,795,295 A * 8/1998 Hellmuth et al. .......... 600/407
5,963,247 A * 10/1999 Banitt ........................ 348/121
5,967,979 A * 10/1999 Taylor et al. ............... 600/407
6,400,980 B1 * 6/2002 Lemelson ................... 600/478
6,538,732 B1 * 3/2003 Drost et al. ................. 356/241
6,575,969 B1 * 6/2003 Rittman, III et al. ......... 606/41

OTHER PUBLICATIONS

Moller et al., "Real-Time Rendering", 1999, A K Peters, Ltd., pp. 26-27; 185-186.*
Wedekind, P., et al., "Scanning microphotolysis: a new photobleaching technique based on fast intensity modulation of a scanned laser beam and confocal imaging," Journal of Microscopy, vol. 176, Pt. 1, Oct. 1994, pp. 23-33.
Demandolx, D., et al., "Multicolour analysis and local image correlation in confocal microscopy," Journal of Microscopy, vol. 185, Pt. 1, Jan. 1997, pp. 21-36.

* cited by examiner

*Primary Examiner*—Phu K. Nguyen
(74) *Attorney, Agent, or Firm*—Houston Eliseeva LLP

(57) ABSTRACT

The present invention concerns a method and an arrangement for imaging and measuring microscopic three-dimensional structures. In them, a data set is depicted in three-dimensional form on a display (27) associated with the microscope. At least one arbitrary section position and an arbitrary rotation angle are defined by the user. Rotation of the three-dimensional depiction on the display (27) is performed until a structure contained in the three-dimensional form reproduces on the display (27) a depiction that appears suitable to the user. The corresponding analytical operations are then performed on the structure.

14 Claims, 3 Drawing Sheets

METHOD AND ARRANGEMENT FOR IMAGING AND MEASURING MICROSCOPIC THREE-DIMENSIONAL STRUCTURES

CROSS REFERENCE TO RELATED APPLICATIONS

Referenced-Applications

This invention claims priority of the German patent application 101 08 240.1, filed on Feb. 21, 2001, which is incorporated by reference herein.

BACKGROUND OF INVENTION

The invention concerns a method for imaging, measuring, and interacting with microscopic three-dimensional structures. The invention further concerns an arrangement for imaging and measuring microscopic three-dimensional structures.

As a user works at the microscope, image details (differing according to the application) are always in his or her field of view. In all microscopic applications, for example, there exists a class of functions for measuring morphological and densitometric properties. Morphology analyzes conformational and geometrical features, and densitometry analyzes intensity distribution features; in practice, mixed forms may often be encountered. This class of functions also constitutes the basis for many automatic adjustment operations. In present-day systems, the user works with image details by marking them on the screen with a suitable graphical mechanism (thus defining a geometry) and selecting a desired function of the system, the sequence described here being arbitrary. For three-dimensional geometries, this is a difficult process.

Three-dimensional geometric structures within three-dimensional image stacks that have been generated from data imaged with a microscope are difficult to apprehend mentally. In the real world, many users have only a partial three-dimensional conceptual capability, since 3D models demand a complex mental construction process and thus a certain amount of practice. This is particularly difficult when working with the raw data of a 3D microscope in the form of sectional images, in which case the user must completely reconstruct the three-dimensionality mentally. Measurement obliquely in space of continuous lengths that are not acquired in one section requires, on the basis of the acquired sections, complex navigation through the stack of acquired two-dimensional image data. If the user has no ability to conceptualize in three dimensions, the structure of interest can be identified only with considerable effort.

Concrete examples from microscopy of actions in whose context this problem arises include:

a) Statistical analysis of local properties of images and volumetric image stacks (profiles, histograms, co-localizations, material roughness);

b) Observation of physiological reactions in living cells and in individual compartments (parts of a cell distinguishable in terms of metabolism or structure) thereof;

c) Zoom operations;

d) Aligning the image field;

e) Controlling actuators;

f) Defining locally different excitation and detection parameters;

g) Automated control operations utilizing geometric data.

The publication of D. Demandolx and J. Davoust, Multicolor Analysis and Local Image Correlation in Confocal Microscopy, Journal of Microscopy, Vol. 185 Pt. 1, January 1997, pp. 21–36 discloses a number of densitometric analysis methods. The individual analyses require both a geometric selection of the object to be analyzed and geometric selections in a specific analytical space (the cytofluorogram). The publication of P. Wedekind, U. Kubitschek, and R. Peters, Scanning microphotolysis: A new photobleaching technique based on fast intensity modulation of a scanned laser beam and confocal imaging, journal of Microscopy, Vol. 176, Pt. 1, October 1994, pp. 23–33, discloses a capability for overlaying onto an acquired image of an object geometric elements that are differently illuminated on the specimen, and effecting changes in the specimen by way of the energy transport associated therewith.

Standard microscope systems make available usually implemented in software geometric models suitable for this purpose (polygons, rectangles, more generally a "region of interest" or ROI) that the user defines. This usually requires a time-consuming interactive process. The region is drawn with the mouse on the display of a computer system; then it is made available to the corresponding automation function.

SUMMARY OF INVENTION

It is the object of this invention to create a method in which the measurement of three-dimensional structures is possible even without any spatial conceptual ability. In addition, the method according to the present invention makes it easy to define a subvolume that is to be imaged.

The stated object is achieved by way of a method that comprises the following steps:

depicting a data set in three-dimensional form on a display associated with a microscope;

defining at least one arbitrary section position and an arbitrary rotation angle;

rotating the three-dimensional depiction on the display until a structure contained in the three-dimensional form reproduces on the display a depiction that appears suitable to the user for further processing;

and performing an analytical operation on the structure.

A further object of the invention is to create an arrangement in which the measurement of three-dimensional structures in an imaged specimen volume is possible. The arrangement is intended to be independent of the user's three-dimensional conceptualization capability. In addition, specific scan parameters can be applied to arbitrarily selected subvolumes of the imaged specimen volume.

The stated object is achieved by way of an arrangement which comprises:

a microscope, a display associated with the microscope, a PC, an input device associated with the PC, a first window shown on the display for depicting a plurality of section planes, from viewing directions differing in each case, a second window shown on the display for depicting a rotational view, a third window shown on the display for a visual depiction of the coordinates, the rotation angle, and a section position; and a respective crosshairs is shown in the depiction of each section plane, for interactive modification of the section position, wherein the image content in the first window is updated in accordance with a modification.

The advantage of the invention is that the measurement of three-dimensional geometric structures within three-dimensional image stacks that have been acquired with a microscope is considerably simplified. The structure of three-dimensional objects is difficult to apprehend mentally, especially when working with raw data imaged by the microscope in the form of sectional images. In such a case the user must mentally reconstruct the three-dimensionality in order to stay oriented within the specimen. The method according to the present invention and the arrangement greatly facilitate this, by the fact that the requisite measurement means and adjustment devices, as well as a computationally ascertained reconstruction, are presented concurrently. This means less cognitive effort by the user and faster work, and thus more efficient utilization of the equipment (work vs. time). Measurement tasks, for example on lengths extending obliquely in the volume that are not acquired in one section, are made substantially easier. If a structure of interest is not acquired in one section, then with conventional methods it must be discovered, in a time-consuming process, on the basis of the acquired sections by navigating through the image stack. This is made much more difficult if the user lacks three-dimensional conceptual ability, but is facilitated by the method according to the present invention and the arrangement. In the approach selected here, it becomes a simple matter of lining up and measuring. This combined utilization of minimal user inputs (mouse clicking) and the acquired microscopic image data to identify suitable section planes greatly enhances the ergonomics of the entire arrangement. In addition, the user is given a capability for easily navigating through the image stack without losing orientation. It is additionally advantageous that with the method, the data of three-dimensional subvolumes can be transferred directly to the microscope control system. The microscope control system can then apply appropriate or selected scan parameters to the specific specimen volume.

BRIEF DESCRIPTION OF DRAWINGS

The subject matter of the invention is depicted schematically in the drawings and will be described below with reference to the Figures, in which.

DETAILED DESCRIPTION

Figure 1:
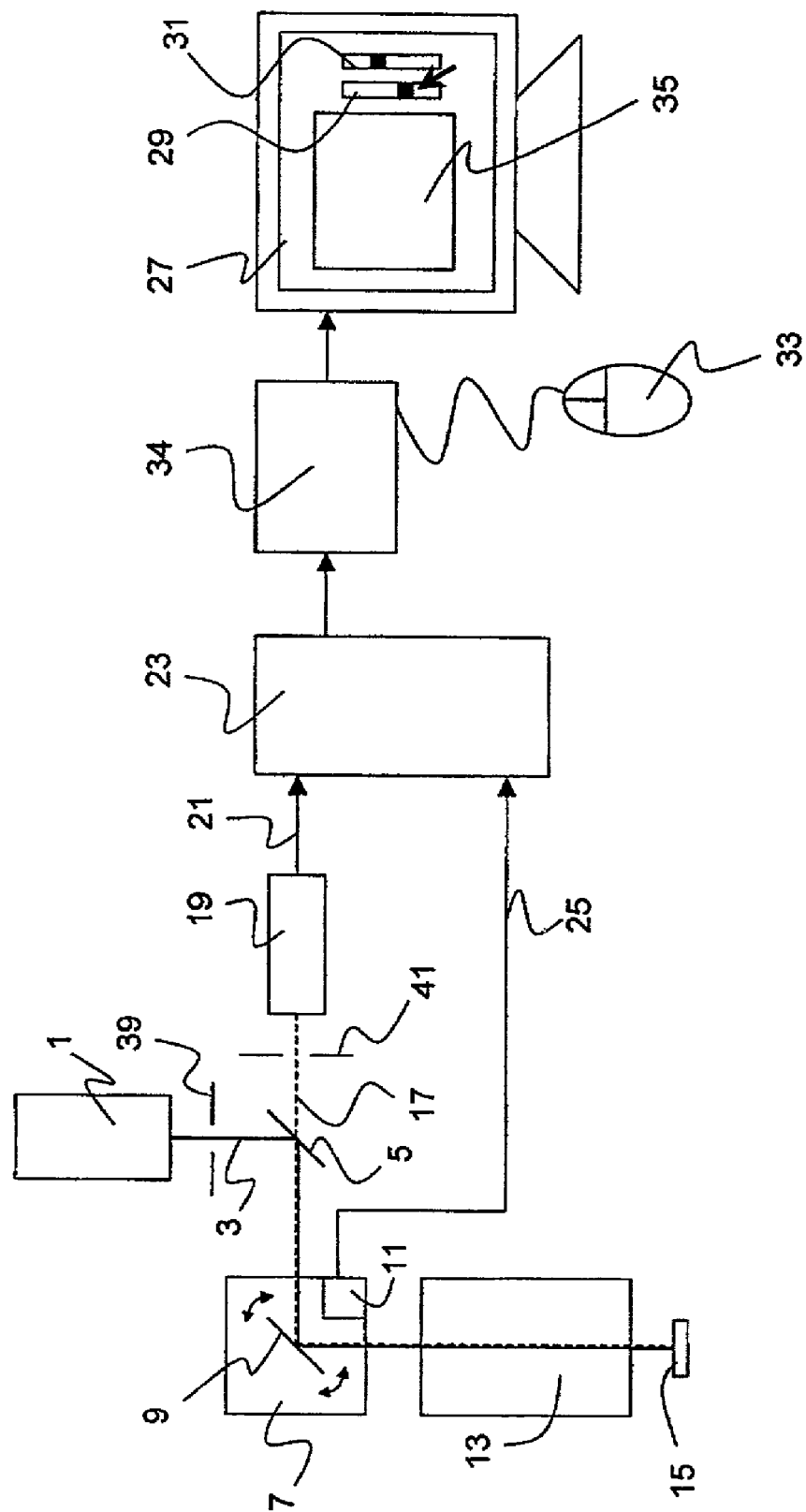
FIG. 1 is a schematic depiction of a confocal scanning microscope in which the present invention is utilized.

FIG. 1 schematically shows a confocal scanning microscope. Light beam 3 coming from an illumination system 1 is reflected by a beam splitter 5 to scanning module 7, which contains a gimbal-mounted scanning mirror 9 that guides the beam through microscope optical system 13 over or through specimen 15. In the case of non-transparent specimens 15, light beam 3 is guided over the specimen surface. With biological specimens 15 (preparations) or transparent specimens, light beam 3 can also be guided through specimen 15. This means that different focal planes of specimen 15 are successively scanned by light beam 3. Subsequent assembly then yields a three-dimensional image of specimen 15. The image stack comprising a plurality of two-dimensional images is assembled into a three-dimensional image. Light beam 3 coming from illumination system 1 is depicted as a solid line. Light 17 proceeding from specimen 15 comes through microscope optical system 13 and via scanning module 7 to beam splitter 5, passes through the latter and strikes detector 19, which is embodied as a photomultiplier. Light 17 proceeding from specimen 15 is depicted as a dashed line. Electrical detected signals 21 proportional to the power level of light 17 proceeding from specimen 15 are generated in detector 19 and forwarded to processing unit 23. Position signals 25 sensed in scanning module 7 with the aid of an inductively or capacitatively operating position sensor 11 are also transferred to processing unit 23. It is self-evident to one skilled in the art that the position of scanning mirror 9 can also be ascertained by way of the adjustment signals. The incoming analog signals are first digitized in processing unit 23. The signals are transferred to a PC 34 to which an input device 33 is connected. The user can, with reference to processing of the data, make corresponding selections by means of input device 33. In FIG. 1, a mouse is depicted as an input device 33. It is self-evident to anyone skilled in the art, however, that a keyboard, joystick, voice input, and the like can also be used as input device 33. A display 27 depicts, for example, an image 35 of specimen 15. In addition, adjusting elements 29, 31 for the acquired image can also be depicted on display 27. In the embodiment shown here, adjusting elements 29, 31 are depicted as sliders. Any other configuration lies within the specialized ability of one skilled in the art. PC 34 forwards the corresponding data via line 37 to processing unit 23. The position signals and detected signals are assembled in processing unit 23 as a function of the particular settings selected, and are shown on display 27. The form in which the adjusting elements are depicted on display 27 is immaterial for the invention. Illumination pinhole 39 and detection pinhole 41 that are usually provided in a confocal scanning microscope are schematically drawn in for the sake of completeness. Omitted in the interest of better clarity, however, are certain optical elements for guiding and shaping the light beams. These are sufficiently familiar to the person skilled in this art.

The method is used for the imaging and structural measurement of microscopic three-dimensional structures in a specimen 15, the microscopic image having been acquired with a microscope. In this context, the three-dimensional structure can be arranged in any spatial position within specimen 15 and within the microscopic image. The microscopic image can be described as an acquired volume I(x), where I(x) defines the vector of the acquired spectral components (channels or spectral image with the SP module) at volume position x of the voxel. A rotated specimen 15 or microscopic image can be generated using a rotation vector $$\alpha = \begin{pmatrix} \alpha_x \\ \alpha_y \end{pmatrix}$$

in which the individual angles $\alpha_x$ and $\alpha_y$ are the rotations about the corresponding axis in the mathematically positive direction (alternatively, and with no limitation as to generality, it is also possible to use YZ or XZ angle components, since the rotation of a body in three dimensions has only two degrees of freedom). Using the rotation matrix $$M(\alpha) = \begin{pmatrix} 1 & 0 & 0 \\ 0 & \cos\alpha_x & -\sin\alpha_x \\ 0 & \sin\alpha_x & \cos\alpha_x \end{pmatrix} \cdot \begin{pmatrix} \cos\alpha_y & 0 & \sin\alpha_y \\ 0 & 1 & 0 \\ -\sin\alpha_y & 0 & \cos\alpha_y \end{pmatrix}$$

a rotated volume I(y) can be described in the coordinates y=M(α)x. This descriptive form is existing art in computer graphics (see Foley, van Dam, Feiner, Hughes: Computer Graphics Principle and Practice. 2nd ed. (1996) p. 215, Reading, Mass., Addison Wesley).

Utilizing the technique of "orthosectioning," arbitrary sections can be generated from this rotated volume. This is done by defining, in the rotated coordinates $$y_0 = (x_0 y_0 z_0)^T$$

a position vector that implicitly defines three two-dimensional planes:

plane 1:

$$\epsilon_1 \cdot t_{xy} = (x,y) \mapsto y(t_{xy}) = (x,y,z=z_0)$$

plane 2:

$$\epsilon_2 \, t_{xz} = (x,z) \mapsto y(t_{xz}) = (x,y=y_0,z)$$

plane 3:

$$\epsilon_3 \cdot t_{yz} = (y,z) \mapsto y(t_{yz}) = (x=x_0,y,z)$$

On the basis of the matrix relationship indicated above, these individual planes can be determined in the original volume using $$x(t_{ab}) = M(\alpha)^{-1} y(t_{ab})$$

The images along the oblique sections are of interest; these images can be reconstructed by selecting various interpolation methods. Interpolated methods are established existing art, and the methods most familiar to those skilled in the art may be looked up, for example, in Lehmann, G ö nner, Spitzer: Interpolation Methods in Medical Image Processing. IEEE Transactions on Medical Imaging, Vol.18, No. 11 (1999), pp. 1049–1075. All the methods listed therein are valid in connection with the method according to the present invention, and can be configured as options that result in different depiction quality levels. Interpolation methods of this kind are not necessary in "orthosectioning," but are essential here. For interpolation, the values at the plane positions are determined from adjacent voxels by linear weighting. This expanded form of "orthosectioning," and the three resulting images $I(x_{ab})$, then make it possible to visualize any desired obliquely located sections, and provide access to any desired obliquely located linear geometric structures in the image.

The method according to the present invention can be summarized as follows: In order to rotate the acquired three-dimensional image, the rotation angles are assigned. From the rotation angles, a transformation matrix is calculated. The desired section position within the three-dimensional image is determined, and then the planes are calculated. A back-transformation from the plane back into the original space is accomplished, and calculation of the sectional images is performed from the volume data by interpolation. The sectional images calculated in this fashion are then shown on display 27 as the result.

It is evident to one skilled in the art that this method can be applied not only to the acquired raw data, but also to derived data (e.g. a ratio), an improved volume (inverse filter), or a volume manipulated in any way.

As already mentioned above, a plurality of two-dimensional images are acquired by the microscope and ultimately assembled into the three-dimensional image stack. With the method according to the present invention it is also possible to navigate through the image stack. In order to adapt the method better to the user's sensory perception and allow it to be performed in brain-compatible fashion, the following is advisable: An arbitrary section position and arbitrary rotation angle are assigned; an initial setting can be allocated as the default setting. Calculation of the resulting section planes is performed in accordance with the method described above. The resulting section planes and the section geometry are depicted on display 27. Visualization is performed as a wire-frame model, or the acquired image can also be visualized three-dimensionally, in which case the rotation conforms to the angle of view and the sections in the three-dimensional volume are indicated. Also conceivable is a combination of the wire-frame model and three-dimensional visualization. For simplified adjustment of the rotation angle and section plane, adjustment elements are provided on display 27. Interactive modification of the angle and section plane parameters is performed by the user with simultaneous visual monitoring. The modification can continue until the structure being looked for is depicted on display 27 in the form desired by the user.

Figure 2:
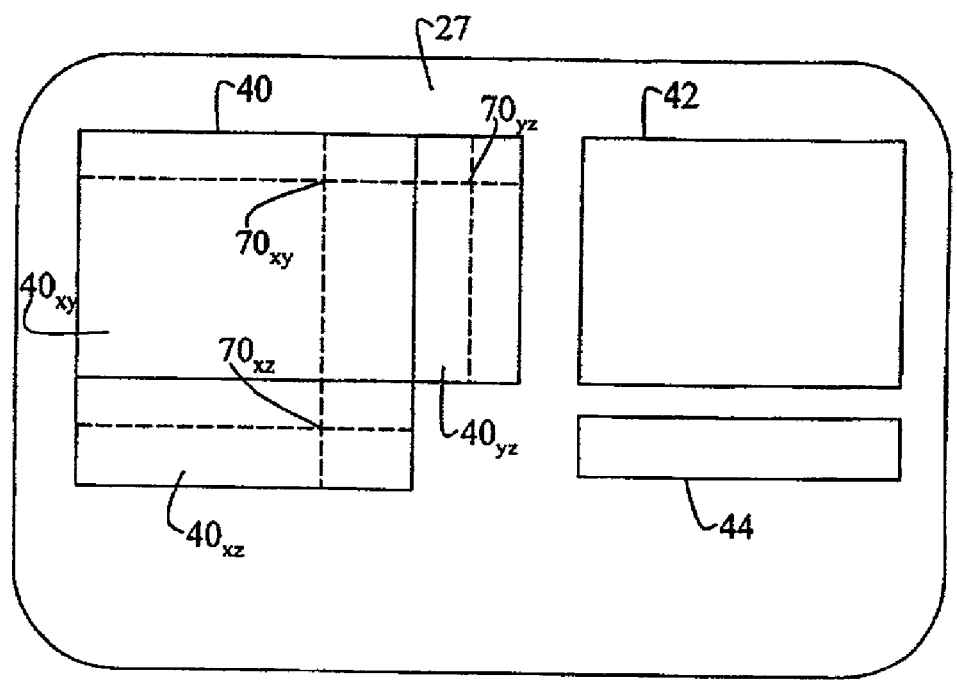
FIG. 2 shows an embodiment of a user interface for graphical depiction of the three different planes that are placed through a specimen volume.

FIG. 2 shows one possible interface to be depicted for this purpose in display 27, with which the images and associated positional data are presented to the user. In the depiction on display 27, the "orthosectioning" view is combined with the view of a volume renderer and with a wire-frame object (see FIG. 3). FIG. 2 shows a preferred embodiment, the implementation being left to the specialized ability of one skilled in the art. On display 27, several individual elements are configured as virtual control elements. These individual elements are implemented by means of software in PC 34, and can be directly manipulated by the user by means of input device 33, e.g. a mouse, a voice input, or a touch screen. In the preferred embodiment, on display 27 the standard "orthosectioning" view is depicted in a first window 40, supplemented by a rotational view in a second window 42. The "orthosectioning" view visualizes in first window 40 an image $40_{xy}$ of XY plane 41, an image $40_{xz}$ of XZ plane 43, and an image $40_{yz}$ of YZ plane 45, images $40_{xy}$, $40_{xz}$, and $40_{yz}$ being lined up with one another at the corresponding edges. The current position $$y_0 = (x_0 y_0 z_0)^T$$

within images $40_{xy}$, $40_{xz}$, and $40_{yz}$ is indicated in each of the images by a crosshairs $70_{xy}$, $70_{xz}$, and $70_{yz}$; by manipulating crosshairs $70_{xy}$, $70_{xz}$, and $70_{yz}$ in the individual regions by means of a mouse or an equivalent input device, the section position $$y_0 = (x_0 y_0 z_0)^T$$

can be interactively modified and the image content in the individual images $40_{xy}$, $40_{xz}$, and $40_{yz}$ can be updated during the modification. A third window 44 on display 27 allows visual depiction of the coordinates, and shows both the rotation angle and the section position. The rotation visualization depicted in second window 42 of the display ensures that the rotation can be modified as the user wishes. A wide variety of configurations is conceivable for this purpose. On the one hand, visualization could be accomplished by means of two nested cuboid models using line graphics, overlaid on which is an orthogonal three-dimensional crosshairs $70_{xy}$, $70_{xz}$ and $70_{yz}$ that reflects the position $$y_0 = (x_0 y_0 z_0)^T$$

Figure 3:
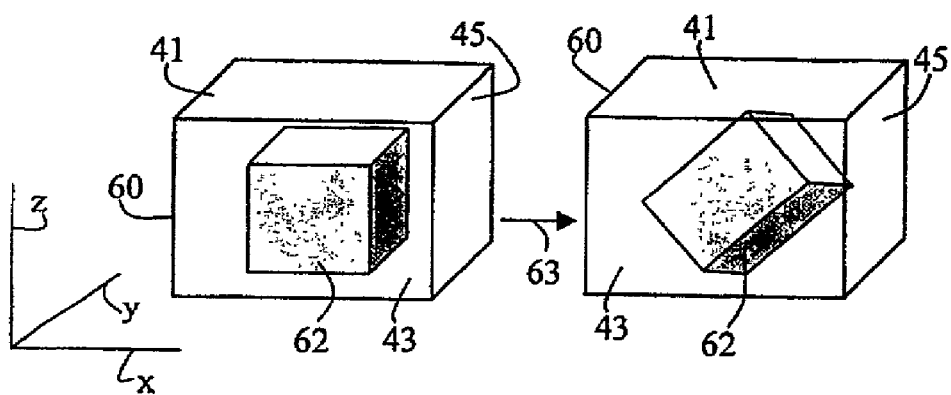
FIG. 3 is a schematic depiction of a cubic model for depicting the specimen volume and of an aid for the purpose of achieving orientation of the view upon rotation of the specimen volume.

A depiction of the view of a wire-frame object using the cuboid models is shown in FIG. 3. An outer cuboid 60 represents the section geometry within whose boundaries the position $y_0$ can vary. Outer cuboid 60 also represents the view of a volume 62 to be examined. An arrow 63 symbolizes the transition to the depiction of the outer and inner cuboids, in which inner cuboid 62 is rotated and thus depicts the rotated volume. A corresponding software program links the rotation of inner cuboid 62 to movements of the mouse or similar input devices. Inner cuboid 62 can be replaced by a volume reconstruction of the imaged specimen 15. This is done by using so-called volume rendering algorithms, which essentially simulate (more or less realistically, depending on the method) the way image creation proceeds macroscopically. This method makes it possible to create a realistic image of specimen 15, resulting a further decrease in the cognitive effort by the user.

The actual configuration of these components is left to the artistic design capability of the implementing person skilled in the art. In addition to standard visualization techniques such as average, maximum, or transparent projection, the simulated fluorescence projection (SFP) method designed specifically for fluorescence microscopy is also suitable, as well as all the enhancement and graphic design tricks of computer graphics. The depiction of the outer and inner cuboids 60 and 62 using line graphics and the depiction of inner cuboid 62 as a volume reconstruction of the imaged specimen 15 can be combined.

The measurement of lengths in the imaged volume provides a further analytical capability. For determination of a length 50, a first and second position 51 and 52 in the imaged volume must be defined. The geometric distance between the two positions 51 and 52 is then the desired length 50. There are, in principle, two possibilities which allow a user to define positions 51 and 52 in the volume using the method.

The user navigates into the plane in which the complete length 50 of interest is located, and marks the first and second positions 51 and 52. An input device 33, for example a mouse, panel box, voice input, etc. can be employed for this purpose. Another possibility is for the user to navigate into the plane in which the first position 51 is located and mark it. He or she then navigates into the plane in which second position 52 is located, and marks it as well. Once the positions have been defined, PC 34 can calculate and visualize the geometric distance. Navigation into the plane in which the structure to be measured is located is very much easier and more intuitive for the user to do, and is already suitable for 99.9% of all measurement problems that occur in practice.

Figure 4:
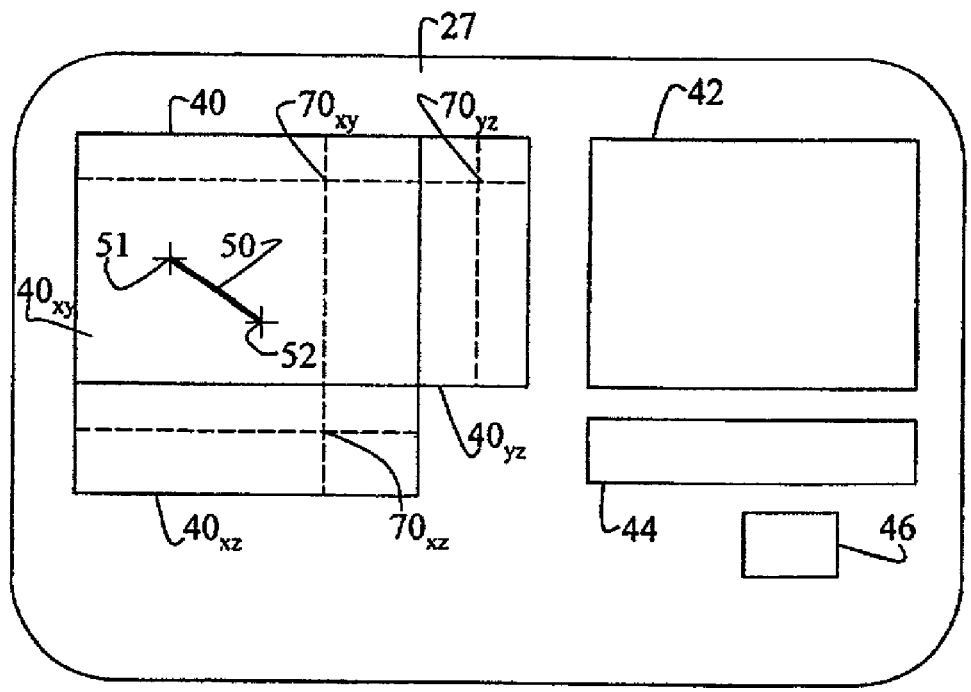
FIG. 4 shows a further embodiment of a user interface for determining a length in an imaged specimen volume.

FIG. 4 shows a depiction on display 27 that visualizes for the user the method for ascertaining a length 50. If the arrangement described in FIG. 2 is expanded to include control elements (not depicted) for drawing a line onto images $40_{xy}$, $40_{xz}$, and $40_{yz}$, it is then possible to measure oblique lengths. The numerical lengths are displayed in a coordinate window 46 depicted on display 27. Before that, however, the volume must be aligned appropriately so that the user is suitably presented on display 27 with the structure to be measured. Then the first position 51 and second position 52 are determined. This can be done by direct marking of the points on display 27 or by displacing a ruler object (not depicted). PC 34 can determine therefrom the length 50 of the structure. The results are presented to the user, for example, in readable form in third window 44 on display 27.

In the method for ascertaining a length in a volume, it is possible to make use of interpolation methods in order to utilize and visualize the intensity distribution (or similar parameters coded into the gray values). To do so, the volume is first aligned in accordance with the desired section plane as already described above. The length or lengths of interest in the volume can then be defined. Based on the defined lengths, the intensities are interpolated along them. The result is depicted in a chart. Interpolation is necessary because the discrete topology of the volume is not identical to the topology of the line, and must be adapted. Interpolation is the best possible way of estimating the distribution of the intensities on the line. The intensity graphs thus presented allow conclusions to be drawn as to specimen positions based on the quantitative profile of the intensity. More details are visible in the chart than in the image, which is subject to the limits of perception.

In a further embodiment of the invention, obliquely oriented surfaces 54 are also measured. The properties of interest of the obliquely oriented surfaces in a volume can be determined by defining a region of interest (ROI). The properties are, for example, area, roundness, etc. An ROI in this context is a graphical figure that is overlaid on the image in order to describe the shape of the specimen in a manner desired by the user, and serves as a basis for analyses. As in the case of the other methods already described above, the plane must be appropriately aligned. The ROI is determined or selected using a corresponding graphical drawing tool or an automatic function. Surface 54 lying within a continuous line 56 is designated the ROI. On the basis of the selection, the size is calculated and then the result is presented to the user. Examples of automatic and semi-automatic functions for ROI determination are described, for example, in P. Hastreiter, T. Ertl: Fast and Interactive 3D Segmentation of Medical Volume Data, Proc. IMDSP 98 (1998), Alpbach, Australia ("intelligent cropping"); and in Blake, Isard: Active Contours, Heidelberg, Springer (1999) ("active contours"), and are to be regarded as existing art. Without the rotation and alignment components of the method described above, certain classes of ROIs are not accessible.

Figure 5:
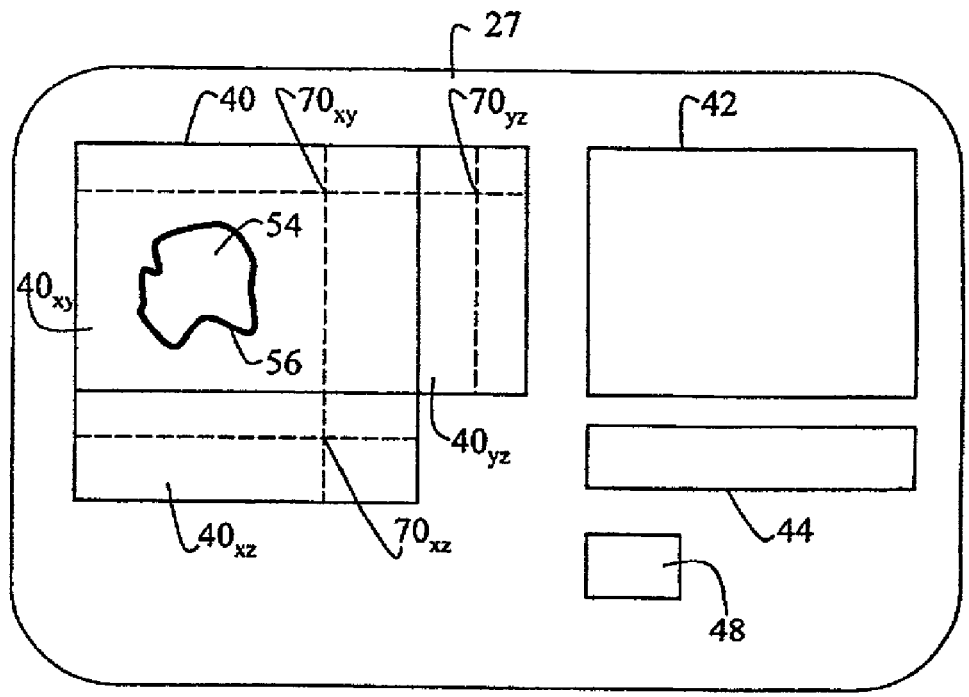
FIG. 5 shows a third embodiment for measuring areas and generating delimited volumes in the imaged specimen volume.

FIG. 5 shows an addition to or a further embodiment of the arrangement of the various windows on display 27. In FIG. 5, control elements 48 for drawing continuous line 56 onto the first window are added.

A further embodiment of the method is to define multiple continuous lines 56 in different planes of the acquired image. Surfaces 54 resulting therefrom are assembled into a stack. The result is a three-dimensional volume on which certain analyses can be performed. This volume is directly accessible to measurement. Rotation of the plane is not essential here, but for certain volumes it does greatly simplify handling, since if the specimen is rotated appropriately, the continuous lines 56 of the sections through the volume become simpler and the user does not need to draw complex lines. Once the plane has been aligned using the method described above, a volume is constructed from the basic surfaces. The desired sizes are then calculated and shown on display 27. Once again, a considerable savings in working time is achieved.

A further interesting use of the method is to create a capability which makes it easy to apply the scan parameters exclusively to a selected volume. Once the volume has been determined in the manner described above, the scanning operation can, for example, be applied exclusively to the specific sample. The determination of the best possible scanning geometry for acquiring this selected structure or volume is made by software, taking into account the microscope technique presently in use (e.g. objective, pinhole sizes, optical resolution) as well as signal-theory considerations (scanning theorem, Nyquist). With regard to microscope technique, the calculation takes into account what can technically be achieved with the type of microscope available and the equipment (such as objectives) that is available and installed. Applicable signal-theory considerations include which structure is resolvable and how often it needs to be scanned. Once the requisite parameters have been calculated, the scan is performed.

As a further embodiment of the invention, arbitrary three-dimensional curves (not depicted) are defined within the acquired image. Scanning or bleaching then occurs along those curves. The three-dimensional curve is once again generated from a stack of multiple two-dimensional continuous lines 56. The scanning microscope is then controlled in such a way that only points on the three-dimensional spatial curve are scanned. Scanning exclusively on the three-dimensional spatial curve makes possible not only data acquisition from that curve, but also modification of the specimen on the curve. The modifications of the specimen are, for example, bleaching or shifting.

In addition, the method is used for interactive determination of a point of interest in the specimen volume. The illumination parameters are then modified exclusively for the selected point. The point defines a small specimen volume, making possible transfer of a radiation dose exactly onto the specimen volume defined by the point. This can optionally be followed by a further scanning operation to observe recovery processes, or by the writing of further structures; once again, the second scanning operation acts exactly on the specimen volume.

The invention claimed is:

1. A method for imaging and measuring microscopic three-dimensional structures, comprising the following steps:
   providing a confocal scanning microscope
   depicting a data set in three-dimensional form on a display associated with the confocal scanning microscope;
   defining at least one arbitrary section position and an arbitrary rotation angle;
   rotating the three-dimensional depiction on the display until a structure contained in the three-dimensional form reproduces on the display a depiction that appears suitable to the user for further processing; and
   performing an analytical measurement operation on the structure, wherein upon definition of the rotation angle, a transformation matrix is calculated, and upon definition of the section position, corresponding section planes are calculated and wherein the corresponding section planes are depicted on the display, and the depiction of the sectional geometry is implemented in the form of a wire-frame model made up of an outer and an inner cuboid.

2. The method as defined in claim 1, wherein an "ortho-sectioning" view is assembled in a first window, from multiple images each from a different viewing direction, in such a way that the images are lined up with one another at the corresponding edges, the current position of the images being indicated by a respective crosshairs.

3. The method as defined in claim 2, wherein the position of the images is modified interactively by way of the crosshairs by manipulation by means of an input device, such that in the individual regions, the images are updated during modification and the image content is modified accordingly.

4. The method as defined in claim 1, wherein at least one length to be measured is determined in an imaged volume, the length being defined by a first and a second position and the geometric distance between the two positions representing the desired length.

5. The method as defined in claim 4, wherein the user navigates into the plane in which the first position is located, and marks it; the user then navigates into the plane in which the second position is located, and marks it; and based on the first and second positions, a PC calculates and visualizes the geometric distance.

6. The method as defined in claim 1, wherein at least one obliquely oriented plane or a set of discrete points is determined in a volume; the at least one obliquely located plane is determined or selected by way of a corresponding graphical drawing tool or an automatic function; and the obliquely oriented plane is marked with a continuous line.

7. A method for imaging and measuring microscopic three-dimensional structures, comprising the following steps:
   providing a confocal scanning microscope
   depicting a data set in three-dimensional form on a display associated with the confocal scanning microscope;
   defining at least one arbitrary section position and an arbitrary rotation angle;
   rotating the three-dimensional depiction on the display until a structure contained in the three-dimensional form reproduces on the display a depiction that appears suitable to the user for further processing; and
   performing an analytical measurement operation on the structure,
   wherein multiple surfaces are assembled into a stack that represents a three-dimensional volume; and specific analyses are performed on the volume, wherein the selected volume represents a three-dimensional curve, wherein scan parameters are applied exclusively to the selected volume, and a scanning microscope is controlled in such away that only points on the three-dimensional spatial curve are scanned.

8. An arrangement for imaging and measuring microscopic three-dimensional structures, comprising:
   a microscope,
   a display associated with the microscope,
   a PC,
   an input device associated with the PC,
   a first window shown on the display for depicting a plurality of section planes, from viewing directions differing in each case,
   a second window shown on the display for depicting a rotational view,
   a third window shown on the display for a visual depiction of the coordinates, the rotation angle, and a section position; and
   a respective crosshairs is shown in the depiction of each section plane, for interactive modification of the section position, wherein the image content in the first window is updated in accordance with a modification.

9. The arrangement as defined in claim 8, wherein in the first window an image of the XY plane, an image of the XZ plane, and an image of the YZ plane is depicted, the respective images being lined up with one another at the corresponding edges, and the current position of the images being indicated by the respective crosshairs.

10. The arrangement as defined in claim 8, wherein in the first window, at least one length to be measured can be determined, the length being defined by a first and a second position and the geometric distance between the two positions representing the desired length in the imaged volume.

11. The arrangement as defined in claim 10, wherein an input device is employed to define the first and second positions.

12. The arrangement as defined in claim 10, wherein a coordinate window that numerically depicts the determined lengths to the user is depicted on the display.

13. The arrangement as defined in claim 8, wherein a graphical drawing tool or an automatic function is provided which allows the user to generate in the first window, within a selected area, a continuous line that defines a ROI.

14. The arrangement as defined in claim 13, wherein a volume can be constructed from multiple ROIs; and a computer program is provided for determining the best possible scanning geometry, taking into account signal-theory considerations and the microscope technique presently in use.

* * * * *